Patented Jan. 29, 1929.

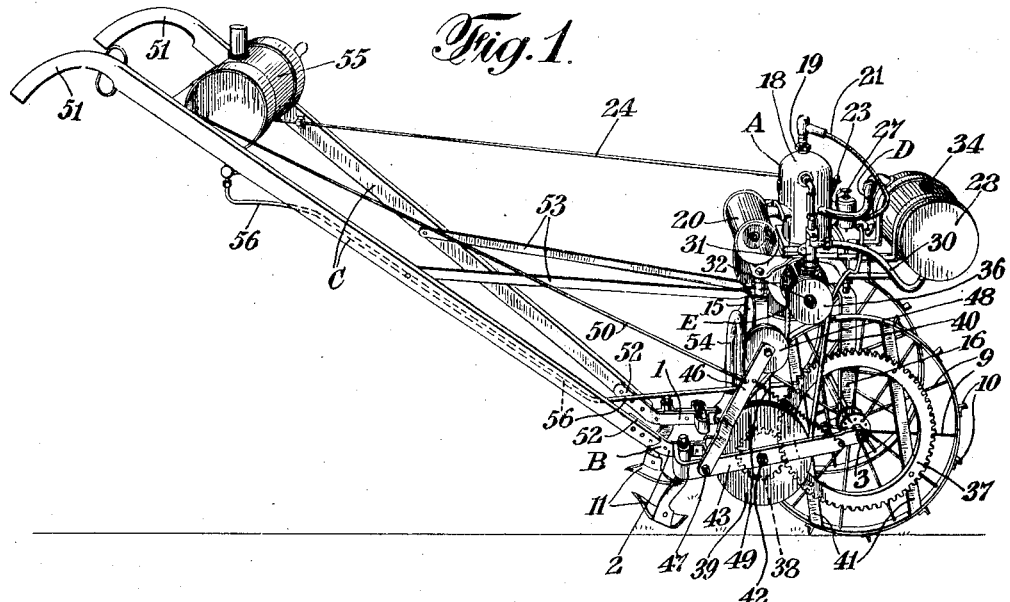

1,700,143

UNITED STATES PATENT OFFICE.

WALTER F. SHERMAN, OF ALBANY, NEW YORK.

TRACTOR.

Application filed May 26, 1924. Serial No. 715,791.

This invention relates to a motor driven hand tractor and the general object of the invention is to provide a tractor which is simple in its construction and operation and extremely light in weight, so that it may successfully be used on soft ground and will not pack the ground upon which it rests.

Another and more specific object of the invention is to provide a tractor having as the source of power, a water cooled internal combustion engine with a pump for circulating the cooling water, thus permitting the use of a smaller amount of cooling water than has heretofore been used and thereby decreasing the weight of the tractor.

A further object of the invention is to provide a hand tractor which is so balanced that when the plow or other tool is not in engagement with the ground, the tractor is balanced, so that it may easily be rolled from place to place with no strain on the operator, but when the plow is in engagement with the ground the tractor is unbalanced to urge the plow into the ground.

Other objects and features of the invention will more fully appear from the following description and the accompanying drawings and will be pointed out in the claims.

The drawings illustrate a preferred form of construction adapted for use in a motor driven hand tractor and embody the broad principles of the invention.

In the drawings, Fig. 1 is a perspective view of the complete tractor.

Fig. 2 is a plan view of the engine and associated parts.

The tractor which forms the subject matter of the present invention is particularly designed for light work in the garden and field, such as the breaking up and finishing of the top soil or land after the plowing has taken place. It is highly desirable when doing such work as this, to have a tractor which is light in weight, so that it will not pack the land as it passes over it. For this reason, the tractor hereinafter to be described has been particularly designed with the view to making all of its parts as light in weight as is consistent with providing parts having the necessary strength.

It has been found in some of the tractors now in use the engine becomes highly heated if continuously used for an extended period of time unless a large amount of cooling water is carried by the tractor. In order to provide a tractor which is light in weight, applicant has discovered that if a pump is provided to circulate the cooling water around the engine and through the water reservoir, the amount of cooling water required to be carried by the tractor is greatly reduced, but yet the engine is sufficiently cooled to enable it to operate without becoming over-heated, and therefore the weight of the assembled motor and cooling system is quite low in proportion to the power delivered by the motor.

The tractor which is the subject matter of this invention is particularly designed to be guided by the hands of a person holding the handle bars and walking behind the tractor. It is therefore desirable to provide a tractor which is so balanced that when it is being used with a plow or other implement to break up the soil, the operator does not have to bear on the handles of the tractor to force the plow or other implement into the ground, and also that when the tractor is being rolled from place to place as from one field to another, the tractor is so balanced that the operator does not have to hold with undue strain the handles of the tractor in such position that the plow or other implement is free from engagement with the ground. Applicant has so proportioned the weight of the various parts of his tractor and has so positioned them that when the plow or other implement is free from engagement with the ground the tractor is so balanced that there is very little or no tendency to push the plow into the ground, thus enabling the tractor easily to be rolled from one place to another, but when the plow or other implement is in engagement with the ground, the tractor is so unbalanced as to force the plow or other implement into the ground.

As illustrated in the drawings which represent the embodiment of one form of the invention, A designates in general, an internal combustion motor mounted by means of supports on a frame B from which handles C extend for the purpose of controlling the movements of the tractor. The cooling system for the motor is designated generally at D and the driving connections between the motor and the wheels of the tractor are generally designated by the letter E.

The frame of the tractor which carries the plow or other implement comprises the rods 1 and 2 which are parallel to one another and extend rearwardly from an axle 3. The tractor is supported by parallel spaced wheels 4 and 5 rotatably mounted on the ends of the axle. The wheels are particularly designed so that they are strong enough to perform all of the work which is required of them, but yet be so light that they add little weight to that of the assembled tractor. To this end the rims of the wheels 6 and 7 are made from thin iron such as fairly heavy strap iron and are connected to the hub 8 of the wheels by wire spokes 9. The projections 10 are formed on the outer circumference of the rim of each wheel to catch in the ground and prevent the wheels from slipping.

In order to provide holders for the plow or plows each of the rods 1 and 2 is bent in an angle as shown at 12 to provide a recess to receive the upper end of the plow. This upper end of the plow or other implement may be provided with a threaded bolt arrangement as shown in Fig. 1 of the drawings, so that the bolt can be tightened against the bars 1 or 2 to hold the plow in place. To give a number of positions in which the plow may be fastened, complementary recessed bars 13 and 14 are provided and fastened to the main frame bars 1 and 2. As illustrated, these complementary bars have two recesses, one of which is opposite the recess of the main frame bar to provide a slot of double length transversely of the tractor, so that extended adjustment of the plows transversely of the tractor may be obtained. The recess bars 13 and 14 may also be formed with another recess behind the first recess to permit adjustment of the plows.

From the frame bars 1 and 2, a plurality of U-shaped supports 15 and 16 extend upwardly to form a bed for the motor. The supports have their ends rigidly fastened to the frame and their bends are uppermost. These supports are preferably made of some heavy strap iron or light iron bars, therefore providing a construction which is as light as possible, but strong enough to give the necessary strength.

The motor is supported on the motor bed formed by the supports 15 and 16. The crank case of the motor is bolted to the bends of the supports which form the motor bed by means of bolts 17, the lower portion of the crank case depending somewhat below the motor bed and between the supports 15 and 16. The motor is illustrated herein as having only a single cylinder 18. The spark plug for the motor is designated at 19 and the muffler at 20. Electricity for igniting the gaseous mixture in the cylinder is supplied to the spark plug through the wire 21 and is generated in the present instance by a magneto contained in the fly wheel 22 of the motor. The spark is controlled by means of a spark lever 23 which is operated from the handles of the tractor by means of a rod 24. The outer portion 25 of the fly wheel is formed with a flange 26 to provide a driving wheel in case the motor is to be used for driving some light high speed machinery such as a cream separator. The explosive gas mixture is supplied to the engine from the carburator 27.

The engine is cooled by means of cooling water contained in a reservoir 28 and conveyed to the engine cylinder by means of flexible hose connections 29 and 30. In order to insure that a steady stream of cooling water passes through the cooling system, the circulating pump 31 is interposed in the cooling system between the end of the hose 30 and the engine cylinder. The pump is operated from the shaft 32 of the motor and is connected by means of the pipe 33 to the water jacket of the cylinder. Thus, as soon as the motor starts to operate the pump is actuated to pump the cooling water through the water jacket of the engine, thereby providing a steady stream of cooling water and preventing the engine from becoming over heated. A removable plug 34 closes an opening in the reservoir 28 through which the reservoir may be filled.

One of the features of my invention is the use of the weight of the water and reservoir to oppose the weight of the engine, so that when the tractor is in such a position that the plow does not engage the ground the motor and water filled reservoir balance each other about the axle as a center and when the plow engages the ground the motor and reservoir are unbalanced to urge the plow into the ground. In order to accomplish this, the water reservoir is supported by means of horizontal arms 35. The U-shaped support 16, which is the forward support, preferably rises from the plow carrying frame at about the point where the frame is connected to the axle. The horizontal arms 35 extend forwardly from the support 16, while the motor extends rearwardly therefrom, thus the motor and water filled reservoir balance each other about the axle 3 as a center. The length of the horizontal arms 35 is so related to the weight of the water filled reservoir that when the tractor is in position with the plow disengaged from the ground, the moment of the water filled reservoir about the axle is approximately equal to the moment of the engine and other parts of the tractor in the rear of the support 16. When the tractor is tilted however, into the position in which the plow engages the ground, the moment of the water filled reservoir about the axle 3 is less than it was when the plow was not engaging the ground while the moment of the engine and other parts of the tractor to the rear of the support 16 is greater than it was when the plow was not in ground engaging position. As a result of this unbalancing, due to the shifting in position of the tractor when the plow engages the ground, there is a force tending to cause the plow to sink more deeply into the ground, thus to a great extent relieving the operator from the strain necessary to force the plow into the ground.

The tractor is driven by means of connections from the driving wheel 36 fast on the shaft 32 of the engine. A gear 37 is fastened to one of the wheels 5 of the tractor and receives its driving power through a driving gear 38 which is mounted on the same shaft with and to rotate with a driven wheel 39 which is driven in any suitable manner as by a belt 40 from the driving wheel 36. In order securely to fasten the gear 37 to the wheel 5 and provide a strong but light construction for transmitting the power from the gear 37 to the wheel 5, power transmitting straps 41 are fastened to and join points on the rim of the wheel. Thus the light wire spokes 9 of the wheel, do not have to transmit any of the power which drives the tractor. The driving gear 38 and the driven wheel 39, which as heretofore mentioned are fast to one another, are carried on a stud 42 which is carried by and projects from an outwardly extending portion 43 of the plow carrying frame. This outwardly extending portion of the plow carrying frame is fastened at 44 to the recess bar 14 and connected at 45 to the axle of the tractor.

In order to provide a clutch device by means of which the tractor may be started or stopped while the engine remains running, a clutch arm 46 is pivoted at one end 47 to the outwardly extending portion 43 of the plow carrying frame and at the other end carries a belt tightening wheel 48 to bear against the belt 40 and cause friction between the wheels 36 and 39 and the wheel engaging portions of the belt 40. A spring 49 is fastened at one end to the clutch arm 46 and at the other end to some suitable stationary part of the tractor as for instance, the outwardly extending portion 43 of the plow carrying frame to draw the belt tightening wheel against the belt. In order to remove the belt tightening wheel from its contact with the belt and thus remove the friction between the belt and the driving and driven wheels 36 and 39 respectively a clutch rod 50 is fastened at one end to the clutch arm 46 and extends in proximity to the hand grips 51 of the handles. With this arrangement of the driving connections between the motor and the wheel of the tractor it is possible to use the small driving wheel 36 to drive fairly heavy farm machinery, such as saw, by removing the belt 40 from the wheel 39 and passing the belt, or a longer one if desired, from the driving wheel 36 around and under the belt tightening wheel 48 and then to the pulley of the machinery to be operated.

The handles C are connected to the plow carrying frame in any suitable and convenient manner. As illustrated, the ends 52 of the plow carrying frame are bent at an angle and the lower ends of the handles C are connected to said bent ends 52 of the frame by means of bolts. The braces 53 extend from the handles C to the motor bed in order to brace the handles and motor and a U-shaped frame brace 54 may be used if desired to brace the rods 1 and 2 of the plow carrying frame. The fuel, preferably gasoline, for the motor may conveniently be carried in a tank 55 situated on the handles so as to be as far removed as possible from the engine. Feed pipe 56 conveys the fuel from the tank 55 to the carburetor 27.

I claim:

1. In a motor driven hand tractor, the combination of a ground engaging wheel having an axle, a plow, a plow carrying frame extending rearwardly from said axle, a plurality of U-shaped supports with their ends rigidly fastened to the frame and their bends uppermost to form a motor bed, a water cooled motor, driving connections between the motor and the wheel, and a water reservoir, said motor and reservoir lying on opposite sides of a vertical line rising from the axle when the plow does not touch the ground and so positioned that when the plow does not engage the ground the motor and reservoir balance each other about the axle as a center and when the plow engages the ground the motor and reservoir are unbalanced to urge the plow into the ground.

2. In a motor driven hand tractor, the combination of a ground engaging wheel having an axle, a rim, wire spokes and power transmitting straps fastened to and joining points on the rim, a gear fastened to said straps, a plow carrying frame extending rearwardly from said axle, a plurality of U-shaped motor supports with their ends rigidly fastened to the frame and their bends uppermost to form a motor bed, a water cooled motor and a cooling water reservoir supported by said supports, water conveying pipes connecting said motor and reservoir, a cooling water circulating pump operated by the motor, a driven wheel and a driving gear fast to each other and rotatably mounted on said frame with said gears in engagement, a driving wheel on the motor in the plane of said driven wheel, a belt operatively connecting said driving and driven wheels and a belt tightening wheel removable and yieldingly engaging said belt.

In testimony that I claim the foregoing, I have hereunto set my hand this 21st day of May, 1924.

WALTER F. SHERMAN.